United States Patent
Ponnuswamy

(10) Patent No.: US 9,693,277 B2
(45) Date of Patent: Jun. 27, 2017

(54) METHOD AND SYSTEM FOR SELECTING AN ACCESS POINT FOR PERFORMING SERVICES CORRESPONDING TO A CLIENT DEVICE

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 57 days.

(21) Appl. No.: 14/678,609

(22) Filed: Apr. 3, 2015

(65) Prior Publication Data

US 2016/0295485 A1   Oct. 6, 2016

(51) Int. Cl.
*H04W 36/24* (2009.01)
*H04W 36/08* (2009.01)
*H04W 4/00* (2009.01)
*H04W 36/22* (2009.01)

(52) U.S. Cl.
CPC ......... *H04W 36/245* (2013.01); *H04W 4/008* (2013.01); *H04W 36/08* (2013.01); *H04W 36/22* (2013.01)

(58) Field of Classification Search
CPC .................................................. H04W 36/245
USPC ........................................................ 370/331
See application file for complete search history.

(56) References Cited

U.S. PATENT DOCUMENTS

| | | | | |
|---|---|---|---|---|
| 7,945,053 B2* | 5/2011 | Qi | ........................... | H04L 9/083 380/277 |
| 2011/0093930 A1* | 4/2011 | Bartel-Kurz | ............ | G06F 21/10 726/4 |
| 2011/0256824 A1* | 10/2011 | Futaki | ................. | H04W 72/005 455/3.01 |
| 2012/0135710 A1* | 5/2012 | Schell | ................. | G06F 12/0246 455/411 |
| 2013/0029635 A1* | 1/2013 | Choi-Grogan | ........ | H04W 36/14 455/405 |
| 2013/0100819 A1* | 4/2013 | Anchan | ................. | H04W 48/20 370/241 |
| 2014/0003342 A1* | 1/2014 | Sheriff | .................. | H04W 76/02 370/328 |
| 2014/0029570 A1* | 1/2014 | Lee | .................... | H04W 36/0005 370/331 |
| 2014/0045505 A1* | 2/2014 | Henry | ............... | H04W 36/0061 455/444 |
| 2014/0293829 A1* | 10/2014 | Visuri | ................... | H04L 12/145 370/254 |
| 2016/0014648 A1* | 1/2016 | Hamilton | .......... | H04W 36/0083 455/436 |

* cited by examiner

*Primary Examiner* — Melvin Marcelo
*Assistant Examiner* — Peter G Solinsky
(74) *Attorney, Agent, or Firm* — Invoke

(57) ABSTRACT

A method includes selecting a particular access point for performing service corresponding to a client device that is associating or associated with a different access point. The particular access point is selected based on historical usage pattern and/or a future scheduled event corresponding to the client device.

20 Claims, 5 Drawing Sheets

METHOD AND SYSTEM FOR SELECTING AN ACCESS POINT FOR PERFORMING SERVICES CORRESPONDING TO A CLIENT DEVICE

TECHNICAL FIELD

The present disclosure relates to selecting an access point. In particular, the present disclosure relates to selecting a particular access point for performing services corresponding to a client device that is associating or associated with a different access point.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

General Overview

In one or more embodiments, a particular access point is selected for performing services associated with a client device that is currently associated with another different access point.

In one embodiment, the particular access point is selected based on historical usage pattern related to the client device. The historical usage pattern may indicate that the client device is likely to roam to the particular access point or be located in the vicinity of the particular access point.

In an embodiment, the historical usage pattern is related to a frequency with or an amount of time for which the client device previously associated with the particular access point. Historical usage patterns may be determined for different time periods, such as, for example, mornings, evenings, lunch hour, weekdays, specific months, etc.

In another example, the historical usage pattern is related to the client device previously associating with at least one access point in a group of access points that includes the particular access point. In another example, the particular access point is selected based on historical usage pattern related to the client device previously being located within a geographical region corresponding to the particular access point.

In an embodiment, the access point selected for performing services associated with the client device is different than the access point providing network access to the client device. The selected access point and the access point providing network access may be located in different networks. Data transmitted between the selected access point and the access point providing network access may be exchanged via a data encryption tunnel.

A. Architechtural Overview

Figure 1:
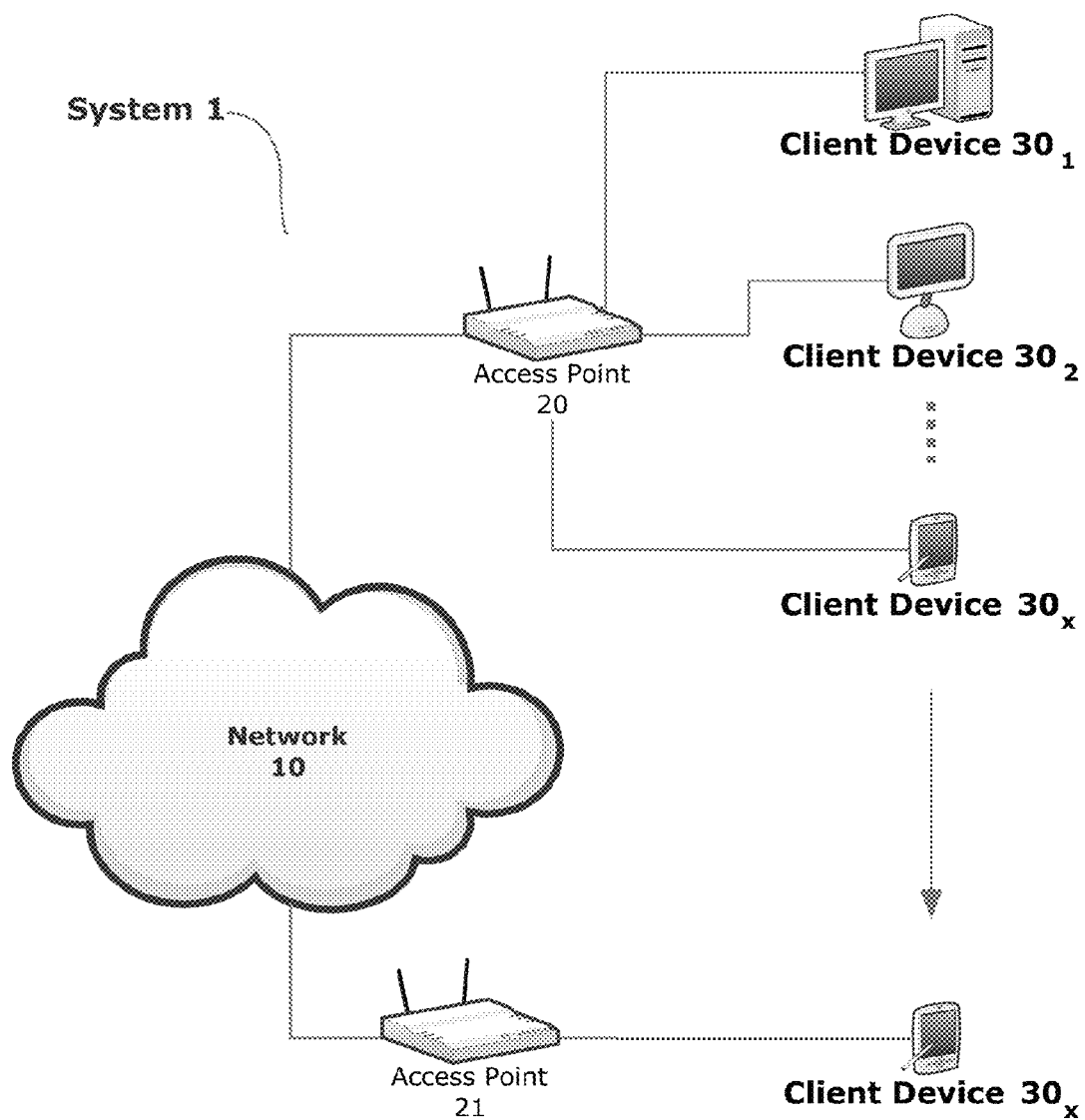
FIG. 1 shows a block diagram example of a system in accordance with one or more embodiments.

FIG. 1 shows a block diagram example of a system which includes digital devices in accordance with one or more embodiments. In one or more embodiments, System 1 may include more or less digital devices, than the devices illustrated in FIG. 1.

The term "digital device" generally refers to any hardware device that includes a processor. When the digital device is adapted for communications with a network, the digital device may be configured as a network device, a client device, or both. A digital device may refer to a physical controller device or a hardware device executing a virtual controller.

A digital device may be a network device and/or a client device. A "network device" is a digital device that may be configured to provide a network service. A "client device" is a digital device that may be configured to receive a network service. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant "PDA", a wireless receiver and/or transmitter, an access point, a base station, a communication management device, a router, a switch, and/or a controller.

System 1, as illustrated in FIG. 1, is a system that includes a network 10 (for example, a Local Area Network, a Wide Area Network, the Internet, Intranet, etc.), an access point 20, an access point 21, and a set of client devices $30_1$-$30_x$. Access point 20 and access point 21 are communicatively coupled to the network 10 via a transmission medium to send and receive data. The data may include, for example, video data. The transmission medium may be a wired or a wireless connection. Access point 20 and access point 21 may be on a same network or different networks. Access point 20 and access point 21 may be on the same Internet Protocol Subnet or different Internet Protocol Subnets.

In one example, access point 20 and access point 21 are located within a building of a corporation. The access point 20 and access point 21 are managed remotely by a third party service. An administrator and/or a computer system associated with the third party configures the access points (for example, the Radio Frequency parameters) by transmitting commands over the internet to the access points. The remote management of the access points may be referred to as cloud based management of the access points.

In one example, System 1 may include one or more controllers (not shown) which are configured to communicate with one or more access points (for example, access point 20 and access point 21) within System 1. The controller links one or both access point 20 and access point 21 to network 10. Alternatively, two separate controllers link access point 20 and access point 21 to network 10.

In one or more embodiments, access point 20 and access point 21 each correspond to a network device such as a wired access port, or a wireless access port. An access point communicatively couples a client device to one or more other devices and/or resources within System 1. In an example, the access point 20 is configured to forward data to or from the client devices $30_1$-$30_n$.

In an embodiment, the client devices $30_1$-$30_n$ are digital devices that include a processor, memory, and input/output (I/O) interfaces including a wireless interface such as an IEEE 802.11 wireless interface. The wireless interface may be used to communicate with the access point 20 to obtain access to devices and/or resources within System 1. The client devices $30_1$-$30_n$ may be wireless electronic devices that are capable of receiving voice data streams, video data streams, or any other type of data. Examples of client devices include personal computers, laptop computers, netbook computers, wireless music players, portable telephone communications devices, smart phones, tablets, and digital televisions.

In an embodiment, one or more access points (or other remote or local network devices) store information about one or more client devices. The information associated with a client device includes any of:
 a. Authentication Information—Information related to, used in, or generated during prior authentications of the client device.
 b. Multicast Information—Information related to multicasts received by the client device.
 c. Optimization Information—Information related to the configuration of the client device or configuration of access points in communication with the client device for optimal performance.
 d. Encryption Key Information—Information related to encryption keys used for encrypting data received by the client device or data sent by the client device.
 e. Firewall Session Information—Information related to a firewall session defining acceptable data sources or data types for the client device.
 f. Gateway Information—Dynamic Host Configuration Protocol (DHCP) parameters used for an access point when communicatively coupling the client device to one or more resources on a network.
 g. Fast Roaming Information—Keys for Opportunistic Key Caching (OKC) as defined under IEEE 802.11

B. Access Points

Figure 2:
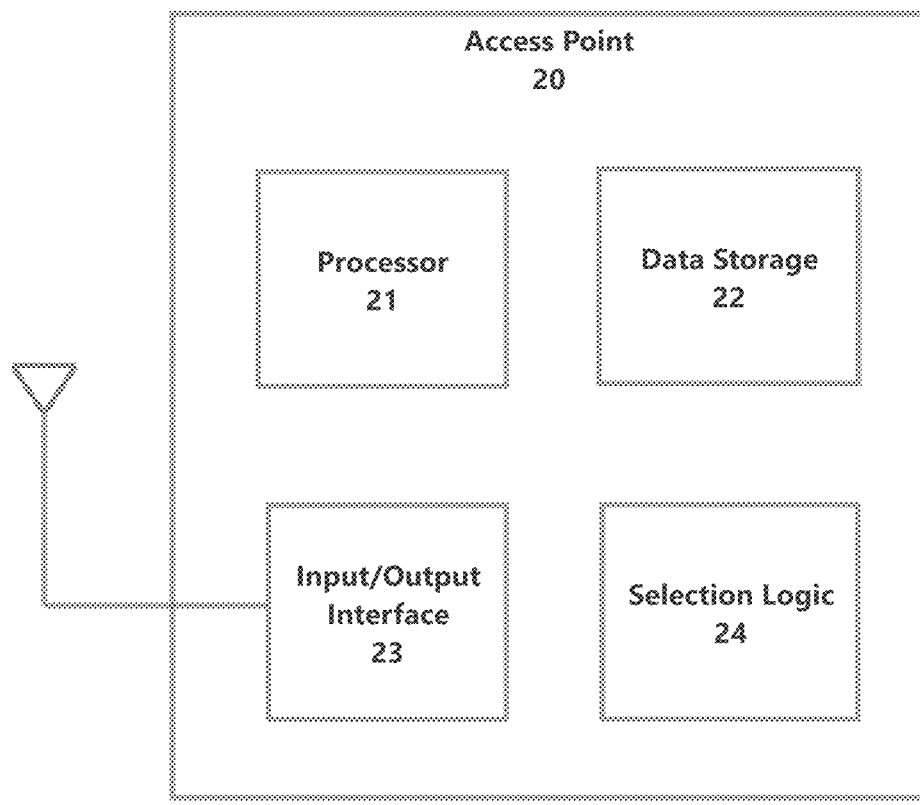
FIG. 2 shows a block diagram example of an access point in accordance with one or more embodiments.

FIG. 2 shows a block diagram example of access point 20 (or access point 21) in accordance with one or more embodiments. One or more steps described herein as being performed by an access point, may be performed by another local or remote network device. For example, the network device may be a local controller that communicates with the access point over one or more local networks or a remote (cloud-based) controller that communicates with the access point over the internet. The controller may be implemented as one of the Virtual Machines (VMs) executing on a network device. Furthermore, one or more components described herein as being implemented within an access point may be implemented within another network device such as a controller. Access points within System 1 may be configured similarly or differently than access point 20. Access point 20 is a network device that comprises one or more of: a processor 21, data storage 22, an I/O interface 23, and a selection logic 24.

The data storage 22 of the access point 20 may include a fast read-write memory for storing programs and data during the access point 20's operations and a hierarchy of persistent memory such as ROM, EPROM, and Flash memory for storing instructions and data needed for the startup and/or operations of access point 20. The data storage 22 stores data that is to be transmitted from the access point 20 or data that is received by access point 20. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 Wi-Fi interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, the selection logic 24 includes one or more functional units implemented using firmware, hardware, software, or a combination thereof for selecting an access point for performing services corresponding to a client device associated with another different access point. Although, the selection logic 24 is shown as implemented on access point 20, some or all physical or functional components of the selection logic 24 may be implemented on other network devices (for example, other access points or controllers). A central cloud-based entity may include components to monitor and/or collect data related to the client devices including historic usage patterns, future scheduled events, and/or information for a client device as described above in Section A. The central entity may perform one or more of the functions described herein.

C. Services Performed for a Client Device by a Selected Access Point

In an embodiment, an access point is selected for performing services corresponding to a client device that is associated with another different access point. The services performed by the selected access point may include but are not limited to:
 A. Storing information related to the client device: The selected access point may store at least a portion of the information associated with the client device. Examples of information associated with the client device include, but are not limited to, authentication information, multicast information, optimization information, encryption key information, firewall session information, gateway information, and fast roaming information (as described above). In an example, the selected access point generates this information and/or receives this information from a first access point. The selected access point may forward this information to a second access point with which the client device is attempting to associate with and/or authenticate with. The selected access point may use this information if the client device attempts to associate with the selected access point.

B. Serving as contact device for reaching the client device: In an embodiment, the selected access point receives information addressed to the client device and forwards the information toward the client device. In an example, the selected access point receives a multicast stream subscribed to by the client device and forwards the multicast stream toward the client device via a current access point with which the client device is currently associated. Alternatively, the selected access point may itself subscribe to the multicast stream in response to receiving an IGMP JOIN request from the client device and thereafter, forward the multicast stream toward the client device. In another example, broadcasts on a Virtual Local Area Network (VLAN) received by the selected access point are forwarded to the client device via a current access point that the client device is associated with.

C. Obtaining an Internet Protocol (IP) address for the client device: In an embodiment, the selected access point transmits DHCP messages to a DHCP server and/or receives DHCP messages from the DHCP server related to assigning an IP address to the client device. In an example, a client device associates with a first access point. The client device then transmits a DHCP request to the first access point. The first access point encapsulates the DHCP request and transmits the encapsulated DHCP request to the selected access point. The selected access point extracts the DHCP request from the message received from the first access point and transmits the DHCP request to a DHCP server. The DHCP server assigns an IP address (via an offer and acceptance process) that corresponds to a VLAN of the selected access point. As a result, the client device belongs to the VLAN of the selected access point even though the client device is associated with the first access point on a different VLAN. Broadcast messages transmitted on the VLAN of the selected access point are forwarded to the client device by the selected access point via the first access point. Broadcast messages transmitted by the client device are forwarded by the first access point to the selected access point and broadcast onto the VLAN of the selected access point.

D. Serving as a home agent: In an embodiment, a home agent is a wireless access point on a client device's home network (defined as the network corresponding to the IP address assigned to the client device). The home agent maintains information about the client device (as described above). The home agent uses tunneling mechanisms to forward Internet traffic to the client device via an access point with which the client device has associated such that the client device's IP address does not have to be changed each time the client device connects from a different location (or different VLAN). A home agent may work in conjunction with a foreign agent, which is an access point on the network corresponding to the client device's current location. The foreign agent and the home agent are two types of mobility agents, defined in the Internet Engineering Task Force (IETF) RFC 2002 specification called IP Mobility Support.

Figure 3:
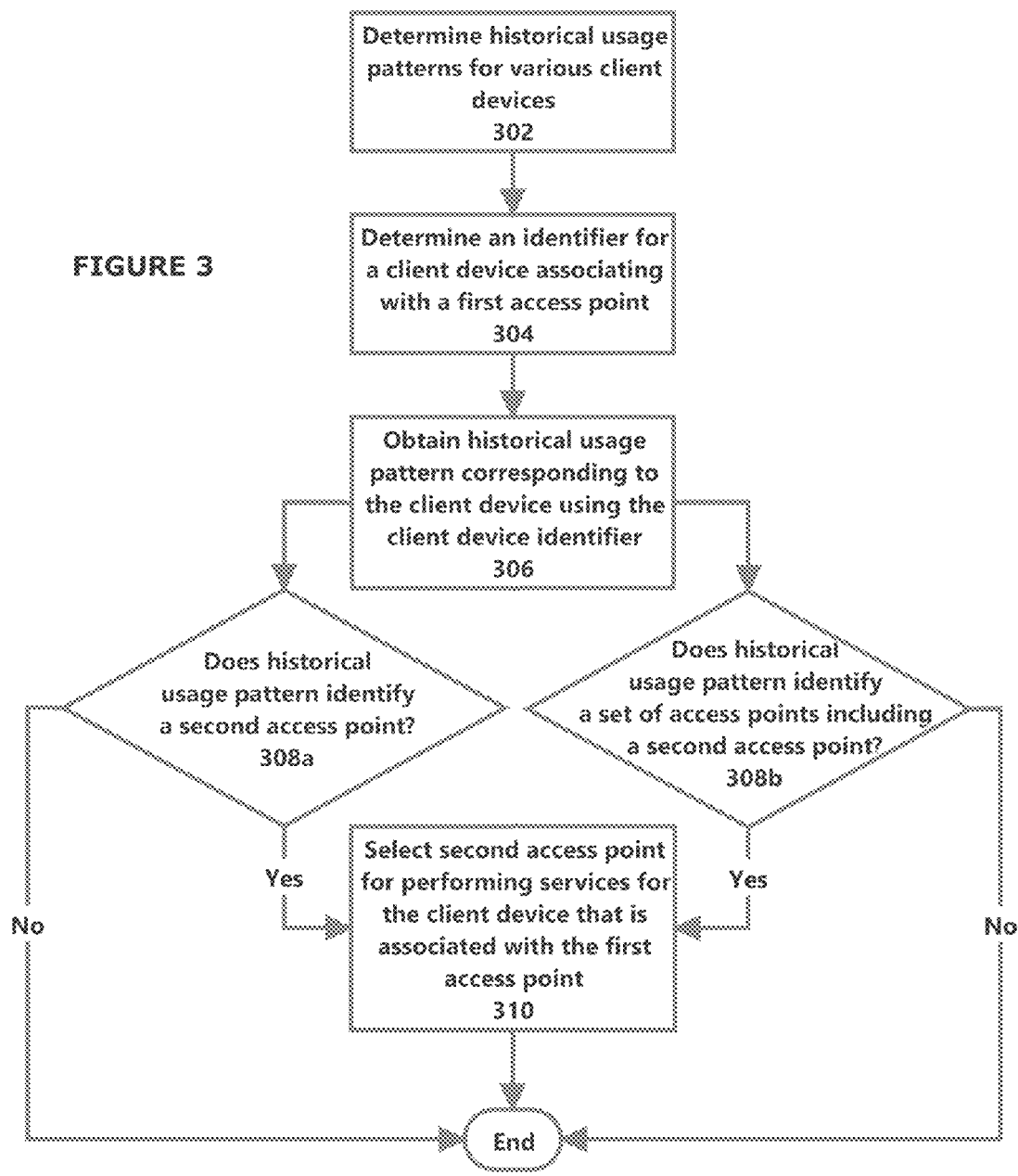
FIGS. 3 and 4 illustrate example operations in accordance with one or more embodiments.

D. Selecting an Access Point for Performing Operations Corresponding to a Client Device Based on Historical Usage Patterns In an embodiment, a client device initiates an association process with a first access point in a first network. An association process generally involves the client device transmitting a PROBE request message(s) and the first access point responding with a PROBE response. In addition, the client device may transmit authentication requests and receive authentication responses (may be referred to as an authentication process or referred to as a step in completing the association process). Even though the client device is associating with the first access point, a second access point is selected for performing a portion of the services corresponding to the client device. Examples of services that may be performed by the selected second access point are described above in Section C. FIG. 3 illustrates an example set of operations for selecting the second access point for performing the services corresponding to the client device that associates with the first access point.

One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, historical usage patterns are determined for various client devices (Operation 302). The historical usage pattern may correspond directly or indirectly to the client device. A historical usage pattern corresponding directly to the client device is determined by monitoring usage of the client device. A historical usage pattern corresponding indirectly to the client device is determined by monitoring usage of other devices related to the client device.

In an embodiment, a historical usage pattern corresponding directly to the client device includes a connectivity pattern for the client device. The connectivity pattern identifies prior access points with which the client device has associated. The connectivity pattern may include detailed information such as a frequency and/or time of association with any particular access point. The connectivity pattern may include a duration of time for which the client device generally associates with a particular access point. In an example, over the course of a month, each association between the client device and various access points is recorded. The total duration for associating with a particular access point may be determined by aggregating all periods of time during which the client device is associated with the particular access point or by measuring the longest period of time during which the client device is associated with the particular access point or by aggregating only a subset of the periods of time based on a filtering criteria.

The connectivity patterns may be grouped, for example, by hours, days of week, weekdays, weekends, months, etc. In an example, the connectivity pattern indicates that a majority of time between 8 am and 5 pm from Monday to Thursday, the client device associates with an access point on the second floor. The pattern is due to the fact that a user of the client device has an office on the second floor and the user generally works from his office from 8 am to 5 pm, Monday to Thursday except when the user leaves for lunch or for meetings. The connectivity pattern further indicates that the client device generally associates with an access point on the third floor from 8 am to 5 pm on Fridays. The pattern is due to the fact that the user of the client device has all day meetings on Fridays with colleagues on the third floor. The connectivity pattern is used to determine a predicted location of the client device: second floor from 8 am to 5 pm, Monday through Thursday and third floor from 8 am to 5 pm on Fridays. The connectivity pattern may be general or specific. For example, the connectivity pattern indicates that the client device is associating with access points on the second floor. In another example, the connectivity pattern indicates that the client device is associating with access point x from the group of access points on the second floor. In another example, the connectivity pattern indicates that a tax accountant's laptop is most frequently connected to the access point in his office from January to April during tax season. Other months may be associated with more inconsistent patterns when the tax accountant is travelling and/or presenting to potential clients in a conference room.

The connectivity pattern may indicate that a client device is most likely to connect to access point r or most likely to connect to a group of access points R. The connectivity pattern be indicate granular time-based patterns such as the client device is most likely to connect to access point r each weekday morning from 8 am to noon and connect to access point s each weekday afternoon from 1 pm to 4 pm. The connectivity pattern may be more general and simply indicate that the client device most frequently associates with access point r from all the access points in the building.

In an embodiment, a historical usage pattern corresponding directly to the client device includes a location history for the client device. The location history identifies prior locations of the client device. In an example, the location history indicates that the client device is generally located in a particular conference room every Wednesday from 9 am to noon. In another example, the location history indicates the client device is usually located in a cafeteria from 8 am to 9 am on weekdays (e.g., when the user has breakfast).

In an embodiment, a historical usage pattern corresponding indirectly to a client device is based on usage of devices other than the client device. The historical usage pattern may correspond to devices within a same group of devices as the client device. In an example, the historical usage pattern for a laptop includes connectivity information for the laptop and connectivity information for other devices registered to the same user as the laptop.

In one example, a user carries a laptop and a tablet to work each day and switches between the laptop and tablet based on tasks being performed by the user. The user registers both the laptop and the tablet as devices corresponding to the user which connect to the Wi-Fi network. In response to determining that the laptop and the tablet are registered to the same user, the historical usage pattern for both devices is aggregated into a single profile stored in association with both devices. Location information (and/or connectivity information) for the laptop and for the tablet are aggregated to build a historical usage pattern profile. At times when devices are detected at different locations, a mechanism may be implemented to select the location information corresponding to one of the devices to include in the aggregated location history. In this example, during lunch, the user leaves the laptop in the user's office and takes the tablet to the cafeteria. The laptop is not being actively used by the user during lunch (background processes may still be executing). The tablet is being actively used by the user during lunch in the cafeteria. The system determines the laptop is located in the user's office during lunch on weekdays and the tablet is located in the cafeteria during lunch on weekdays. In addition to identifying different locations for devices corresponding to the same historical usage pattern profile, the system further determines that the tablet is being actively used and the laptop is not being actively used during lunch. Active usage may be determined based on traffic transmitted by the device, detection of movement of the device, utilization of a CPU of the device, etc. In response to detecting the usage of the tablet and non-usage of the laptop, the location of the tablet is selected for recording into the historical usage pattern while the location of the laptop is not included into the historical usage date. Alternative embodiments may include both locations corresponding to both devices, respectively, in the historical usage pattern.

In an embodiment, historical usage patterns that directly or indirectly correspond to the client device are stored in a data repository indexed by an identifier for the client device. For example, the historical usage patterns may be indexed by Media Access Control (MAC) addresses. An aggregated historical usage pattern that is based on the usage of a user's different devices may be indexed by the MAC addresses of multiple devices.

In an embodiment, a client device attempts to connect to a network by initiating an association process. For example, the client device may transmit PROBE requests to identify nearby access points by way of a PROBE response transmitted by the access points. During the association process or after the association process is completed, an identifier for the client device is identified (Operation 304). In an example, the client device identifier is a Media Access Control (MAC) address of the client device or a portion of the MAC address. The MAC address of the client device may be determined from messages transmitted by the client device such as, for example, the PROBE request message or an authentication request. Other client device identifiers may be used in accordance with various embodiments.

In an embodiment, the client device identifier is used to obtain the historical usage pattern corresponding to the client device (Operation 306). In an example, the client device is in the process of associating with a first access point. The first access point determines the MAC address of the client device from the PROBE request received from the client device. The first access point transmits the MAC address of the client device to another network device comprising a data repository of historic usage patterns. A query is executed to search for a historic usage pattern(s) stored in association with the MAC address of the client device. Alternatively, the query may be executed based on locally stored information. The historic usage pattern(s) for client devices may be distributed to and stored locally at the first access point (and/or other access points). The distribution of historic usage pattern(s) for client devices may be broad (to all access points in a network) or selective (to a few access points in a network). A selective distribution list for the historic usage pattern(s) for client devices include access points to which the client devices generally associate with for short periods of time and/or are likely to associate with for short periods of time.

In one example, monitoring association patterns reveals that a client device generally associates with an access point near building entrance A for a short period of time before roaming to another access point. Based on this monitored association pattern, the historic usage pattern(s) for the client device is distributed to the access point near building entrance A.

In an example, an employee named Joe registers a new cellular phone with his employer's Information Technology (IT) department. The IT department adds the MAC address of Joe's new cellular phone to Joe's profile. Joe's profile also includes Joe's laptop. The system has monitored the usage of Joe's laptop and based on the usage of Joe's laptop, the system has determined a historic usage pattern. The historic usage pattern is stored in association with Joe's profile. When the IT department adds the MAC address of Joe's new cellular phone to Joe's profile, the system links the historic usage pattern to Joe's new cellular phone. As a result, the Joe's new cellular phone corresponds (indirectly through Joe's laptop) to the historic usage pattern. When Joe brings his new cell phone to work and the cell phone attempts to connect to the first access point, the first access point initiates a query (executed by the first access point or by another network device) based on the MAC address of Joe's cell phone. The query results in identification of the historic usage pattern that indirectly corresponds to Joe's cell phone. Accordingly, even though Joe's cell phone has never before connected to any of the network devices at Joe's work, a historic usage pattern already corresponds to Joe's cell phone. The same historic usage pattern also corresponds (directly) to Joe's laptop as the historic usage pattern was determined based on the usage of Joe's laptop.

In an embodiment, obtaining the historical usage pattern corresponding to the client device is based on a current time. The current time may be an exact or approximate time of any of operations 302 to 306. In one example, the client device begins an association process with the first client device on Monday at 8 am in March. A data repository includes historical usage patterns for the client device corresponding to monitoring of the client device at various times. Based on current time of Monday at 8 am in March, the historical usage pattern that is obtained may include a pattern that was determined by monitoring the client device on: Mondays, weekdays, the month of March, in the mornings, from 8 am to noon, from 8 am to 5 pm, from 8 am to 10 am, etc. Multiple patterns may be combined to determine the best applicable pattern related to the current time.

In an embodiment, a determination is made if the historical usage pattern identifies a particular access point (Operation 308a) or a set of access points (Operation 308b). As noted above, the historical usage pattern may identify a particular access point as a most frequently connected-to access point overall, may identify the particular access point as a most frequently used access point during a particular time period, may identify the particular access point as having a longest average duration for connections by the client device (or by devices related to the client device), or a combination thereof. A set of access points may be identified instead of a single access point. Different models may be used to identify the particular access point so that atypical behavior does not affect the selection. For example, radio interference on a particular day may cause a client device to repeatedly disconnect and re-connect to access point h. As a result the frequency with which the client device has connected to access point h spikes in comparison to a connection with other access points. In this example, the frequency of connection by itself would provide an inaccurate picture of the usage.

The historical usage pattern may be predictive of actions to be performed by the client device. In an embodiment, the historical usage pattern identifies a specific access point that the client device is likely to connect to in the near future, or a location that the client device is likely to be moved to in the near future. In an example, a user's tablet connects to a first access point located in the lobby of a building as soon as the user enters the building. However, a historical usage pattern corresponding to the tablet indicates, based on historical data, that the user is likely to take the tablet to the user's office where the user works every day. Alternatively, the historical usage pattern indicates that the tablet is likely to connect to one of a group of access points on the second floor where the user works with a team of people. Accordingly, even though the user's tablet connects to a first access point located in the lobby, the system uses the historical usage pattern to determine that the tablet will connect to another access point or one of another group of access points.

It may be advantageous to select the second access point for performing services related to the client device because when the client device associates with the second access point, the second access point will already have the information for the client device. The second access point having the information for the client device allows for a quick and/or efficient process for setting up the client device to obtain network access via a direct connection with the second access point.

It may be advantageous to select the second access point for performing services related to the client device (for example, selection as a "home agent") because when the client device associates with the second access point, the direct connection between the client device and the second access point removes the necessity of tunneling from a home agent to a foreign agent. Embodiments may be advantageous over other systems in which access points are randomly selected as the home agent and where the client device does not directly associate with the randomly selected home agent. In these other systems, the home agent will have to continuously pass traffic to the foreign agent to which the client device associates. Passing traffic between the home agent and the foreign agent throughout the day may lead to degraded performance due to, for example, latency and packet loss.

In an embodiment, the second access point (which is directly identified or indirectly identified by identification of a group that includes the second access point) is selected for performing services corresponding to the client device (Operation 310). The second access point may be selected for performing one or more of the services (examples of services identified above in Section C). Examples include, but are not limited to, storing information related to the client device, serving as a contact device for reaching the client device, obtaining an IP address for the client device, and/or serving as a home agent for the client device.

In an embodiment, the second access point begins performing services for the client device when the client device attempts to connect or successfully connects to the network. For example, the second access point begins performing services for the client device when the client is associating with another access point or has completed association with another access point.

In an embodiment, the selection itself of the second access point for performing the services corresponding to the client device may be performed when the client is connecting to the network, connected to the network, or not connected to the network. In an example, the historical usage pattern of a tablet is determined when the tablet is at the tablet user's work. However, analysis of the historic usage pattern to select the second access point for performing services corresponding to the tablet is performed at night when the tablet has been taken to the tablet user's home. The system stores information mapping the second access point to the tablet for use if the tablet connects to the network again. The next day, when the user returns to work with the tablet, the selected second access point for performing services corresponding to the tablet is already known. The tablet begins and completes an association process with an access point near a receptionist's desk. While the association between the tablet and the access point near the receptionist's desk is being completed, the second access point (selected the night before) begins performing services for the tablet. In an example, the first access point forwards a DHCP request from the client device to the selected second access point which is located on a different IP subnet than the first access point. The second access point communicates with a DHCP server to obtain an IP address for the tablet that corresponds to the IP subnet corresponding to the second access point.

E. Selecting an Access Point for Performing Operations Corresponding to a Client Device Based on a Future Scheduled Event(s)

As noted above, an access point is selected for performing operations corresponding to a client device associating or associated with another access point. In an embodiment, the access point is selected based on a future scheduled event which is predictive of how, where, or when a client device is to be used.

The predicted use of the client device may be based on historical usage patterns described above. For example, based on expected continuation of a historical usage pattern, a particular access point typically connected to by a client device on weekdays is the access point that the client device is predicted to connect to on a given weekday. Accordingly, even though the client device initially connects to a different access point, a system predicts that the client device will soon connect to the particular access point. Predictions based on historical usage patterns rely on a continuation of the historical usage pattern to predict the use of the client device.

In an embodiment, the predicted use of the client device is based on future scheduled events rather than or in addition to historical usage patterns. For example, a user's calendar may indicate that a meeting for the user is scheduled on May 3, 2015 in conference room Delta. When the user walks into the office on May 3, 2015, the user's smart phone initiates an association with a first access point near the office entrance on the first floor. The first access point (or another network device) may obtain a MAC address of the user's smart phone and based on the MAC address, determine that the smart phone is registered to the user. Furthermore, the first access point may determine that the user is scheduled to be in conference room Delta all day based on a query of the user's calendar. Since the user is scheduled to be in the conference room Delta, the smart phone registered to the user is (a) expected to be used in the conference room Delta and (b) likely to connect to a particular second access point located in the conference room Delta in the near future. Accordingly, the particular second access point in the conference room Delta is selected to perform at least a portion of the services corresponding to the user's smart phone while the user's smart phone is associated with the first access point near the office entrance on the first floor.

In an extension to the above example, the smart phone may be forced to connect to the particular second access point in the conference room Delta when/if the user takes the smart phone to the conference room Delta. Specifically, the particular second access point in conference room Delta is configured to accept an association request from the smart phone while access points outside of the conference room Delta are configured to not respond to or reject connection requests from the smart phone. By specifically configuring the particular second access point to accept a connection (in the future when the smart phone is taken to the conference room Delta) and configure other nearby access points to decline the connection, connection of the smart phone with the particular second access point is ensured. Specifically, when the user carries the smart phone to the conference room Delta and the smart home attempts to connect to the network, the particular second access point in the conference room will be the only option for successful connection by the smart phone to the network.

As noted throughout, a second access point is selected for performing at least a portion of the services corresponding to the client device associated with the first access point. In an embodiment, the client device has never before associated with the second access point. In an embodiment, the client device is not within a radio frequency range of the second access point when the second access point is selected for performing at least the portion of the services.

In an example, the second access point is selected for performing services corresponding to a tablet while the tablet is associated with the first access point because a future scheduled event is indicative of a likelihood that the tablet is likely to connect to the second access point during the future scheduled event. The decision to select the second access point based on the future scheduled event in this example is not related to whether or not the client device has associated with the second access point in the past.

In another example, historical usage pattern identifies a group of access points as candidates for performing services corresponding to the client device because the group of access points are located at a location that the client device is likely to be at in the future based on past location data. A particular access point from the group of access points is selected for performing services corresponding to the client device regardless of whether the client device has previously associated with the particular access point. The client device may have associated with another access point in the group of access points when the client device was previously at the same location.

F. Selecting an Access Point for Performing Operations Corresponding to a Client Device Based on Historical Usage Patterns and Future Scheduled Event(s)

In an embodiment, an access point may be selected based on a combination of factors. The combination of factors may include at least historical usage patterns and future scheduled event(s).

In one example, a user of a client device may be scheduled for a meeting on a first Monday of every month in conference room Echo from 9 am to Noon. The scheduled meeting indicates a likelihood that the user's laptop will connect to an access point A in conference room Echo on the first Monday of every month from 9 am to noon. However, a historical usage pattern indicates that the user's laptop is generally located in the user's office during this time and connected to access point B located near the user's office. Based on the historical usage pattern, a determination is made that even though the user is scheduled for the meeting on the first Monday of every month, it is unlikely that the user will attend the meeting. As a result, when the user enters a lobby at 8:30 am on the first Monday of every month and connects to access point C in the lobby, access point B located near the user's office is selected for performing services corresponding to the access point (e.g., serving as a "home agent" for the laptop).

As an alternative to the above example, the historical usage pattern indicates that the laptop is taken to conference room Echo from 9 am to noon every other month on the first Monday of the month. This is due to the fact that the user attends every other scheduled meeting. Based on historical usage pattern and the scheduled meeting, access point A in the conference room Echo or access point B near the user's office are alternatively selected for performing services corresponding to the laptop. Access point A in conference room Echo is selected on Mondays on which the user is likely to attend the meeting. Access point B near the user's office is selected on Mondays in which the user is unlikely to attend the meeting.

In yet another alternative to the above example, a determination is made that while the user's laptop is generally connected to the access point B near the user's office during the scheduled meeting time, the user's cell phone is generally connected to access point A in conference room Echo. This is due to the fact that the user carries his cell phone to the meeting but leaves his laptop in his office. Based on the scheduled meeting and the historical usage pattern, different access points are selected for performing services corresponding to the user's devices. When the user walks into to the lobby at 8:30 am on the first Monday of each month and the user's laptop and cell phone connect to access point C in the lobby, different access points are selected for performing services corresponding to the user's devices. Access point A in the echo conference room is selected for performing services corresponding to the user's cell phone and access point B near the user's office is selected for performing services corresponding to the user's laptop.

G. Selecting an Access Point for Performing Operations Corresponding to a Client Device Based on a Load Balancing Decision In an embodiment, the second access point is selected based in part on a load balancing decision. The historical usage pattern or future scheduled event described above identifies a group of access points that a client device is likely to connect to in the future. The group of access points may have various loads indicated by load values. The load values may represent absolute load values, a percentage of capacity, and/or a load value representing a load in relation to a load at other access points. From the group of access points that is identified based on the historic usage pattern or future scheduled event, the second access point is selected based on load values corresponding to the group of access points.

In an example, a group of access points located on the fourth floor of a building is identified as a candidate set of access points for a future connection by the client device. The candidate set of access points on the fourth floor has been determined based on a historic usage pattern indicating that the client device is generally located on the fourth floor of the building. Based on a load on each of the access point in the candidate set of access points, a particular access point is selected from the candidate set of access points. The particular access point may be selected for having a low load value or having a lower load value than other access points in the candidate set of access points. In an embodiment, access points are selected in a round robin manner across the group of candidate of access points by alternating among the different access points in the group.

Figure 4:
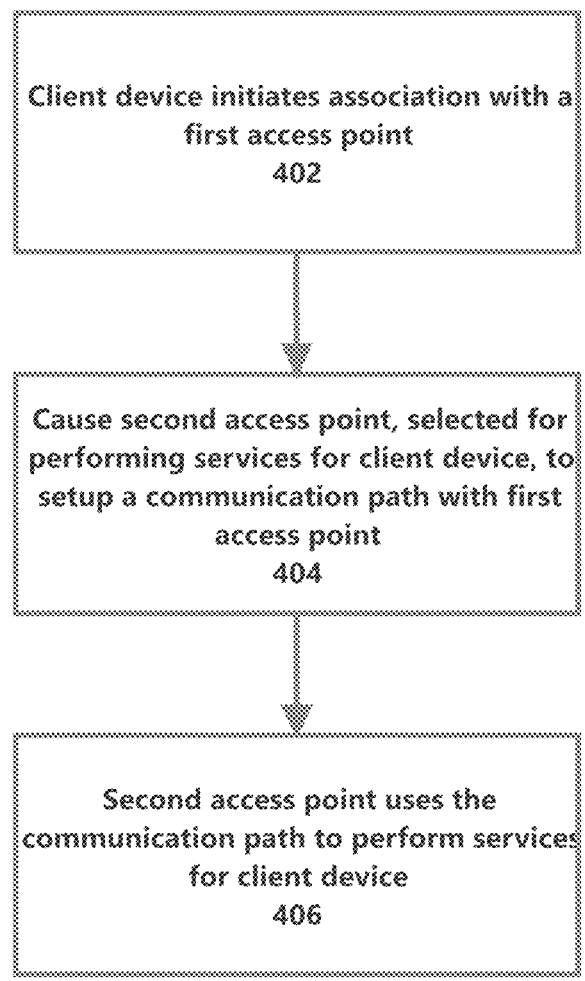

H. Using a Selected Access Point for Performing Services Corresponding to a Client Device Associated with Another Access Point In an embodiment, while a client device associates with a first access point and/or is associated with the first access point, a second access point performs at least a portion of the services corresponding to the client device. FIG. 4 an example set of operations for configuring a system for the second access point to perform the services for the client device associating/associated with the first access point. Other operations not described herein may be used instead and/or in addition to the described operations for configuring the system for the second access point to perform the services for the client device. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a client device initiates an association with a first access point (Operation 402). Initiating the association may include transmitting PROBE requests, association requests, authentication requests and/or any other requests involved in the client device associating with the access point.

An embodiment includes causing a second access point, selected for performing services corresponding to the client device, to setup a communication path with the first access point (Operation 404). Various techniques for selecting the second access point in accordance with one or more embodiments are described throughout this Specification. The second access point may have been selected prior to the client device initiating the association with the first access point, while the association process with the first access point is ongoing, or after the association process with the first access point is completed. The system may be configured for the first access point or the second access point to initiate the communication path.

In one embodiment, at least a portion of the communication path between the first access point and the second access point includes an encapsulation tunnel such as, for example, a Generic Routing Encapsulation (GRE) tunnel or a Control And Provisioning of Wireless Access Points (CAPWAP) tunnel. The encapsulation tunnel may be formed with the first access point and the second access point serving as endpoints. Alternatively, one or both endpoints of the encapsulation tunnel may be network devices other than the first access point or the second access point.

Causing the second access point to setup a communication path may include the use of a proprietary protocol for instructing the second access point to serve as a home agent for the client device. Furthermore, instructions to the second access point may include identification of the first access point as the foreign agent. The instructions may be transmitted by the first access point or by any other network device (for example, a Network Management Station). The second access point uses the communication path to perform services corresponding to the client device (Operation 406).

In an example, a client device initiates an association process with a first access point. The first access points determines the MAC address of the client device and initiates a search for a profile mapped to the client device. The search is executed by a central server and identifies a second access point as being selected to perform services for the client device. The central server transmits a message to the second access point to initiate a GRE tunnel with the first access point. The second access point initiates the creation of a GRE tunnel between the second access point and the first access point. The GRE tunnel is to be used for transmitting communication related to the client device between the first access point and the second access point.

In an embodiment, a communication path between the first access point and the second access point has already been setup for communication unrelated to the client device. The previously setup communication path is used for transmitting data related to the client device.

In one example, the first access point and the second access point are on a first IP subnet and second IP subnet, respectively. An encapsulation tunnel has been setup between the first IP subnet and the second IP subnet using a first network device in the first IP subnet and a second network device in the second IP subnet as endpoints. Network devices within the first IP subnet are configured for forwarding data, targeted for device(s) in the second IP subnet, to the first network device. The first network device forwards the data to the second network device which distributes the data within the second network. In this example, a client device may have initially connected to a first access point in the first IP subnet. The second access point in the second IP subnet was previously selected for serving as a home agent for the client device based on a future scheduled event indicating that the client device is likely to roam to the second access point in the near future. Based on the second access point serving as the home agent, the client device is assigned an IP address corresponding to the second IP subnet. A broadcast message transmitted by the client device is first received by the first access point because the client device is associated with the access point. The first access point determines the message is a broadcast message to be transmitted on the client device's IP subnet (i.e., the second IP subnet). The first access point transmits the broadcast message to the first network device. The first network device, serving as an endpoint for a GRE tunnel, encapsulates the broadcast message inside an outer packet and transmits the outer packet to the second network device in the second IP subnet. The second network device decapsulates the outer packet to obtain the broadcast message. The second network device thereafter broadcasts the broadcast message on the second IP subnet.

Embodiments described herein may further be modified based on filtering of content that is to be transmitted between a home agent and a foreign agent. In an example, broadcasting filtering is used to ensure duplicate copies of the same broadcast content are not transmitted between a home agent and a foreign agent, or between different IP subnets.

In another example, the first access point receives a DHCP request from the client device. The first access point encapsulates the DHCP request in an outer packet. The first access point transmits the outer packet to the second access point. The second access point decapsulates the outer packet to obtain the DHCP request and forwards the DHCP request to a DHCP server. The DCHP offer is received by the second access point from the DHCP server. The second access point encapsulates the DHCP offer in an outer packet and forwards the outer packet to the first access point. The first access point decapsulates the outer packet to obtain the DHCP offer and transmits the DHCP offer to the client device. The client device accepts the DHCP offer by transmitting an acceptance message back to the DHCP server via the first access point and the second access point similar to the DHCP request.

I. Initiating the Use of a Second Access Point to Perform Services Corresponding to the Client Device Associating/Associated with the First Access Point Initiating the use of the second access point to perform services corresponding to the client device associating/associated with the first access point is based on one or more factors.

In an embodiment, use of the second access point to perform services corresponding to the client device that is associating/associated with a first access point is initiated immediately upon selection of the second access point. In an example, the second access point is selected at runtime subsequent to a client device beginning an association with a first access point. Immediately, after selection is completed, the second access point is configured to operate as a "home agent" for the client device and the first access point is configured to operate as a "foreign agent." In this example, the first access point is setup as a foreign agent in an initial setup itself. In another example, the second access point is selected to operate as a "home agent" for the client device when the client device is disconnected from the network. In this example, the information for the client device (e.g., MAC address) from previous connections to the network is used to setup the second access point as the home agent for the client device even though the client device is not currently connected to the second access point.

In an embodiment, use of the second access point to perform services corresponding to the client device that is associating/associated with a first access point is initiated based on a time of an expected direct connection between the client device and the second access point. In an example, the historic usage pattern and/or a known scheduled event for a tablet indicates a high likelihood that the tablet (currently associated with a first access point) will associate with a particular access point located in hotel room 435 at 5 pm. Based on the expected association of the tablet with the particular access point at 5 pm, the use of the particular access point for performing services corresponding to the tablet is initiated at 5 pm or in a specified time period prior to 5 pm. In an example, the use may be initiated ten minutes prior at 4:50 pm or thirty minutes prior at 4:30 pm. The use of the second access point may be initiated when the tablet is not being used or being minimally used. In an example, the use of the second access point as a home agent may be initiated anytime during a period twenty minute prior to the expected connection time (4:40 pm to 5 pm) when the tablet is not being actively used or when the utilization level of the CPU is below 30%. In this example, the first access point, with which the client device is currently associated, is re-configured to function as a foreign agent.

I. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

J. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
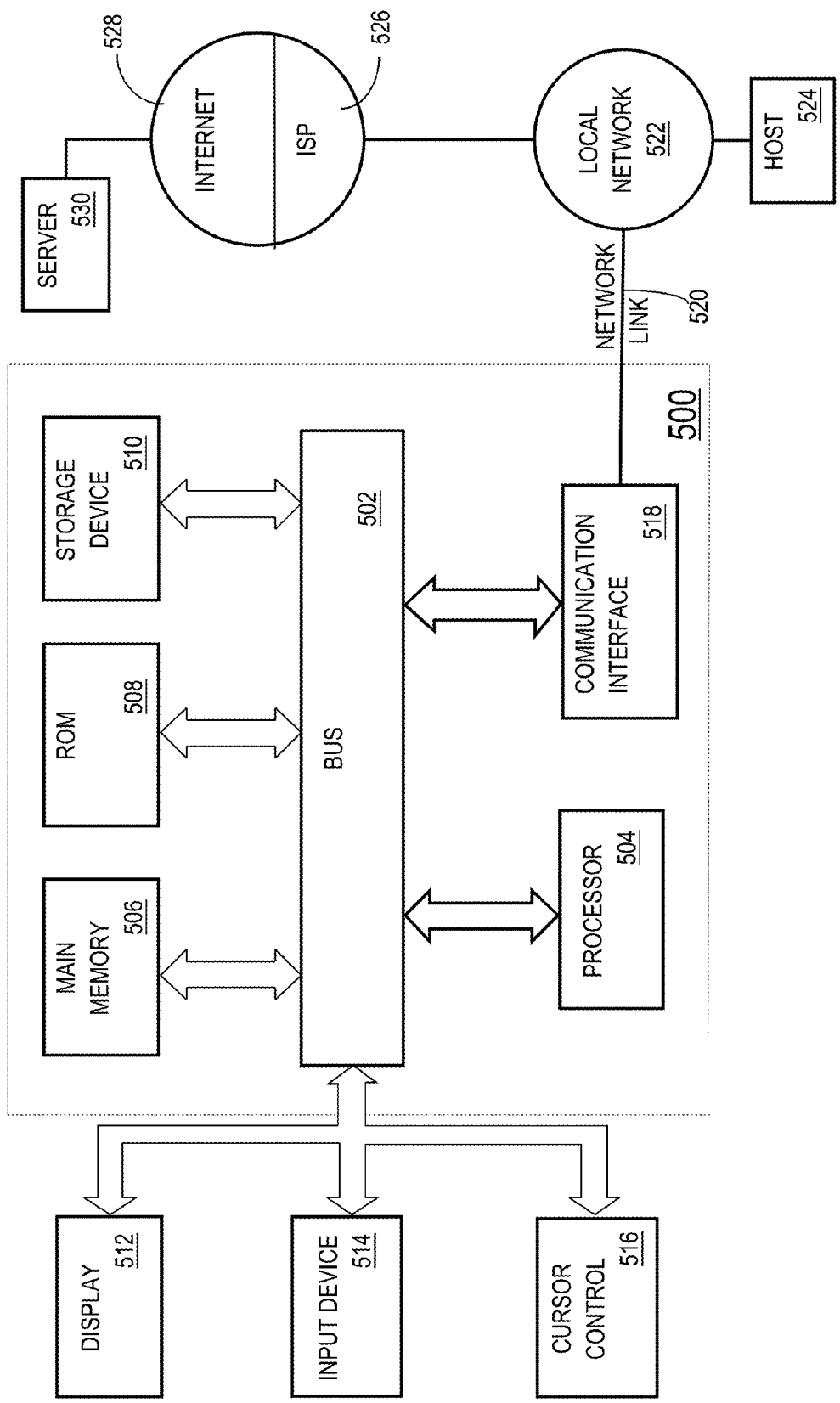
FIG. 5 shows a block diagram example of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
    at least one device including a hardware processor;
    the system being configured to perform operations comprising:
        accepting, by a first access point, an association request from a client device;
        identifying a historical usage pattern for the client device;
        based on the historical usage pattern for the client device, selecting a second access point to perform at least a portion of the services corresponding to the client device, the services to be performed by the second access point;
        performing, by the second access point, at least the portion of the services corresponding to the client device while the client device is associated with the first access point;
        wherein the portion of the services is not being performed, by the second access point, for switching an association of the client device from the first access point to any other access point.

2. The system of claim 1, wherein selecting the second access point is performed prior to the first access point accepting the association request from the client device.

3. The system of claim 1, wherein selecting the second access point is performed subsequent to the first access point accepting the association request from the client device.

4. The system of claim 1, wherein the historical usage pattern comprises a number of times the client device has previously associated with the second access point during a particular time period.

5. The system of claim 1, wherein the historical usage pattern comprises a duration of time during which the client has been previously associated with the second access point during a particular time period.

6. The system of claim 1, wherein the historical usage pattern comprises a number of times the client has device has previously associated with any of a particular group of access points during a particular time period, the group of access points comprising the second access point.

7. The system of claim 1, wherein the historical usage pattern comprises a duration of time during which the client has device has previously associated with any of a particular group of access points during a particular time period, the group of access points comprising the second access point.

8. The system of claim 1, wherein the historical usage pattern identifies a group of access points, and wherein the second access point is selected from the group of access points based on a load balancing decision.

9. The system of claim 1, wherein the second access point is selected at a time when the client device is not within a radio frequency communication range of the second access point.

10. The system of claim 1, wherein the client device has never previously associated with the second access point.

11. The system of claim 1, wherein the historical usage pattern identifies prior locations associated with the client device, and wherein at least one of the prior locations matches a location of the second access point.

12. The system of claim 1, wherein the historical usage pattern is selected from a plurality of historical usage patterns for the client device based on a time when the client device is associating with the first access point.

13. The system of claim 1, wherein the portion of the services comprises serving as a home agent for the client device.

14. The system of claim 1, wherein the portion of the services comprises one or more of:
    storing information related to the client device;
    serving as a contract device for reaching the client device; and/or
    obtaining an Internet Protocol (IP) address for the client device.

15. The system of claim 1, wherein the historical usage pattern for the client device is identified based on prior usage of the client device.

16. The system of claim 1, wherein this historical usage pattern for the client device is identified based on prior usage of another device related to the client device.

17. The system of claim 1, wherein the historical usage pattern indicates a likelihood of the client device associating with the second access point during a particular future period of time.

18. The system of claim 1, wherein the operation of selecting the second access point is performed by the first access point based on historical usage pattern previously received by the first access point.

19. A non-transitory computer readable medium comprising instructions which, when executed by one or more hardware processors, causes performance of operations comprising:
    accepting, by a first access point, an association request from a client device;
    identifying a historical usage pattern for the client device;
    based on the historical usage pattern for the client device, selecting a second access point to perform at least a portion of the services corresponding to the client device, the services to be performed by the second access point;

performing, by the second access point, at least the portion of the services corresponding to the client device while the client device is associated with the first access point;

wherein the portion of the services is not being performed, by the second access point, for switching an association of the client device from the first access point to any other access point.

20. A method comprising:

accepting, by a first access point comprising a hardware processor, an association request from a client device;

identifying a historical usage pattern for the client device;

based on the historical usage pattern for the client device, selecting a second access point to perform at least a portion of the services corresponding to the client device, the services to be performed by the second access point;

performing, by the second access point, at least the portion of the services corresponding to the client device while the client device is associated with the first access point;

wherein the portion of the services is not being performed, by the second access point, for switching an association of the client device from the first access point to any other access point.

* * * * *